US012723923B2

(12) United States Patent
Chi et al.

(10) Patent No.: US 12,723,923 B2
(45) Date of Patent: Sep. 1, 2026

(54) HEAT SOURCE DETECTION SYSTEM

(71) Applicant: InnoLux Corporation, Miao-Li County (TW)

(72) Inventors: Ting-Yeh Chi, Miao-Li County (TW); Chia-Wei Lai, Miao-Li County (TW); Te-Yu Lee, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 359 days.

(21) Appl. No.: 18/585,538

(22) Filed: Feb. 23, 2024

(65) Prior Publication Data

US 2024/0319014 A1 Sep. 26, 2024

Related U.S. Application Data

(60) Provisional application No. 63/491,835, filed on Mar. 23, 2023.

(30) Foreign Application Priority Data

Sep. 21, 2023 (CN) ......................... 202311224698.0

(51) Int. Cl.
*G01J 5/02* (2022.01)
*G01J 5/00* (2022.01)

(52) U.S. Cl.
CPC ............. *G01J 5/026* (2013.01); *G01J 5/0025* (2013.01)

(58) Field of Classification Search
CPC .. G01J 5/026; G01J 5/0025; G01J 2005/0077; G01J 5/02; G01J 5/48
See application file for complete search history.

(56) References Cited

U.S. PATENT DOCUMENTS

2023/0044279 A1* 2/2023 Lu ........................... G01S 17/86
2024/0294182 A1* 9/2024 Lin ....................... B60W 50/14

FOREIGN PATENT DOCUMENTS

TW 201337786 A 9/2013
TW 201818356 A 5/2018

* cited by examiner

*Primary Examiner* — Uzma Alam
*Assistant Examiner* — Gisselle M Gutierrez
(74) *Attorney, Agent, or Firm* — MUNCY, GEISSLER, OLDS & LOWE, P.C.

(57) ABSTRACT

A heat source detection system includes an infrared light detector, a visible light detector, and a processing unit. The processing unit performs an operation according to at least one instruction, wherein the operation includes steps of: acquiring an infrared light image from the infrared light detector; identifying at least a heat source target according to at least one heat source edge in the infrared light image; determining whether at least one preset condition occurs in the at least one heat source target; and activating the visible light detector when the at least preset condition occurs in the at least one heat source target.

19 Claims, 8 Drawing Sheets

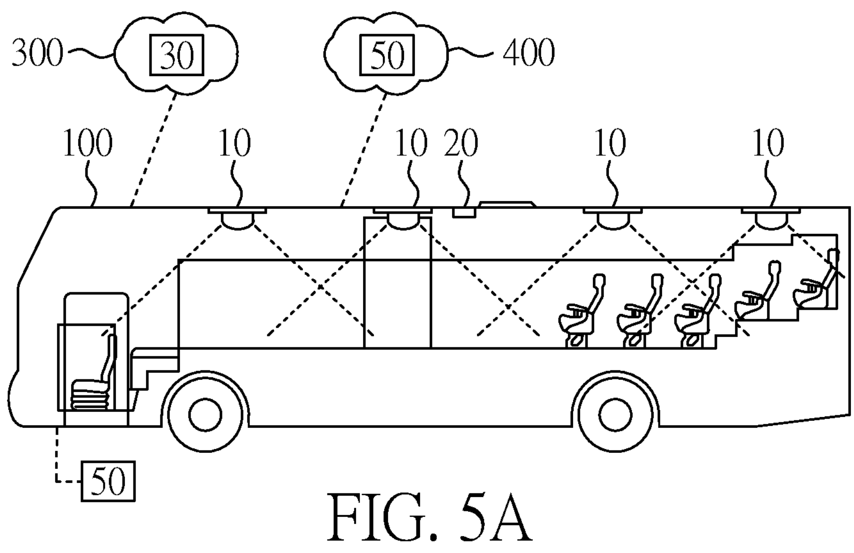

FIG. 5A

S51: infrared light detector acquires infrared light image inside bus, and visible light detector is activated or maintained in inactive state as required

↓

S52: processing unit analyzes infrared light image to acquire information on number-of-people information and body temperature information of passengers in bus, and/or temperature information of objects in bus

↓

S53: processing unit transmits number-of-people information of passengers in bus, body temperature information of passengers in bus and/or temperature information of objects to bus

↓

S54: control unit generates control signal based on number-of-people information, body temperature information and/or temperature information of objects in bus, so that equipment of bus provides visual information or auditory information

↓

<driver may perform subsequent processing according to reference indication>

FIG. 5B

HEAT SOURCE DETECTION SYSTEM

CROSS-REFERENCE TO RELATED APPLICATIONS

This application claims the benefit of filing date of U.S. Provisional Application Ser. No. 63/491,835 filed on Mar. 23, 2023 under 35 USC § 119(e)(1), and also claims the benefit of the Chinese Patent Application Serial Number 202311224698.0, filed on Sep. 21, 2023, the subject matters of which are incorporated herein by reference.

BACKGROUND

Field of the Disclosure

The present disclosure relates to a detection system and, more particularly, to a heat source detection system.

Description of Related Art

Nowadays, visible light detectors have been applied to detection systems in public places. For example, visible light detectors are installed in the waiting areas of transportation vehicles, or installed on the outside or inside of transportation vehicles for surveillance. However, visible light detectors have poor detection results in dim conditions when there is no illumination, making it difficult to identify targets in the image. Moreover, the visible light detector cannot detect the temperature of the target in the image or distinguish suspicious objects with excessively high temperature, and thus its detection function is not comprehensive enough. In addition, the existing technology must turn on the visible light detector for a long time, which not only consumes energy but also is prone to privacy issues. Besides, under long-term monitoring, it takes a lot of time to search the monitoring record back and forth for finding a specific piece of the monitoring record.

Therefore, it is desired to provide a heat source detection system to alleviate and/or obviate the above problems.

SUMMARY

The present disclosure provides a heat source detection system, which comprises: at least one infrared light detector; at least one visible light detector; and a processing unit, wherein the processing unit performs an operation according to at least one instruction, and the operation includes the steps of: acquiring an infrared light image from the at least one infrared light detector; identifying at least one heat source target based on at least one heat source edge in the infrared image; determining whether at least one preset condition occurs in the at least one heat source target; and activating the at least one visible light detector when the at least one preset condition occurs in the at least one heat source target.

Other novel features of the disclosure will become more apparent from the following detailed description when taken in conjunction with the accompanying drawings.

BRIEF DESCRIPTION OF DRAWINGS

FIG. 5A is a schematic diagram of the application scenario of the heat source detection system according to the third embodiment of the present disclosure;

FIG. 5B is an operation flow chart of the heat source detection system corresponding to the application scenario of FIG. 5A.

DETAILED DESCRIPTION OF EMBODIMENT

Figure 1:
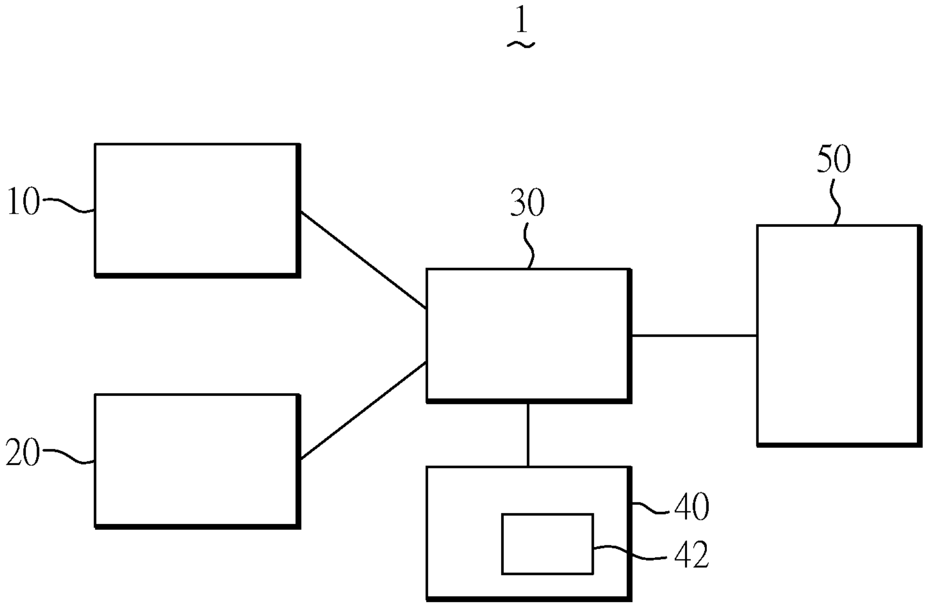
FIG. 1 is a system architecture diagram of a heat source detection system according to an embodiment of the present disclosure.

Reference will now be made in detail to exemplary embodiments of the present disclosure, examples of which are illustrated in the accompanying drawings. Wherever possible, the same reference numerals are used in the drawings and description to refer to the same or like parts.

Throughout the specification and the appended claims, certain terms may be used to refer to specific components. Those skilled in the art will understand that electronic device manufacturers may refer to the same components by different names. The present disclosure does not intend to distinguish between components that have the same function but have different names. In the following description and claims, words such as “comprising”, “containing” and “having” are open-ended words, and should be interpreted as meaning “including but not limited to”.

Directional terms mentioned in the specification, such as “up”, “down”, “front”, “rear”, “left”, “right”, etc., only refer to the directions of the drawings. Accordingly, the directional term used is illustrative, not limiting, of the present disclosure. In the drawings, various figures illustrate the general characteristics of methods, structures and/or materials used in particular embodiments. However, these drawings should not be construed to define or limit the scope or nature encompassed by these embodiments. For example, the relative sizes, thicknesses and positions of various layers, regions and/or structures may be reduced or enlarged for clarity.

One structure (or layer, component, substrate) described in the present disclosure is disposed on/above another structure (or layer, component, substrate), which can mean that the two structures are adjacent and directly connected, or can refer to two structures that are adjacent rather than directly connected. Indirect connection means that there is at least one intermediate structure (or intermediate layer, intermediate component, intermediate substrate, intermediate space) between the two structures, the lower surface of one structure is adjacent to or directly connected to the upper surface of the intermediate structure, and the upper surface of the other structure is adjacent to or directly connected to the lower surface of the intermediate structure. The intermediate structure may be a single-layer or multi-layer physical structure or a non-physical structure, which is not limited. In the present disclosure, when a certain structure is arranged "on" other structures, it may mean that a certain structure is "directly" on other structures, or it means that a certain structure is "indirectly" on other structures; that is, at least one structure is sandwiched, in between a certain structure and other structures.

The terms, such as "about", "substantially", or "approximately", are generally interpreted as within 10% of a given value or range, or as within 5%, 3%, 2%, 1%, or 0.5% of a given value or range.

Furthermore, any two values or directions used for comparison may have certain errors. If the first value is equal to the second value, it implies that there may be an error of about 10% between the first value and the second value. If the first direction is perpendicular or "approximately" perpendicular to the second direction, the angle between the first direction and the second direction may be between 80 degrees and 100 degrees. If the first direction is parallel or "substantially" parallel to the second direction, the angle between the first direction and the second direction may be between 0 degrees and 10 degrees.

In the specification and claims, unless otherwise specified, ordinal numbers, such as "first" and "second", used herein are intended to distinguish elements rather than disclose explicitly or implicitly that names of the elements bear the wording of the ordinal numbers. The ordinal numbers do not imply what order an element and another element are in terms of space, time or steps of a manufacturing method. Thus, what is referred to as a "first element" in the specification may be referred to as a "second element" in the claims.

In the present disclosure, the terms "a given range is from a first value to a second value" or "a given range is within a range from the first value to the second value" means that the given range includes the first value, the second value and other values between the first value and the second value.

It should be understood that, according to the embodiments of the present disclosure, an optical microscope (OM), a scanning electron microscope (SEM), a film thickness profiler (α-step), an ellipse thickness gauge or other suitable measurement means may be used to measure the depth, thickness, width or height of each component, or the spacing or distance between components. According to some embodiments, a scanning electron microscope may be used to obtain a cross-sectional structural image including the components to be measured, and measure the depth, thickness, width or height of each component, or the spacing or distance between components.

In addition, the heat source detection system disclosed in the present disclosure may be integrated in electronic devices, and the electronic devices may include imaging devices, assembling devices, display devices, backlight devices, antenna devices, sensing devices, tiled devices, touch display devices, curved display devices or free shape display devices, but not limited thereto. When the electronic device is an assembling device or a tiled device, the electronic device may include a grabbing mechanism, but not limited thereto. The electronic device may include, for example, liquid crystal, light emitting diode, fluorescence, phosphor, other suitable display media, or a combination thereof, but not limited thereto. The display device may be a non-self-luminous display device or a self-luminous display device. The antenna device may be a liquid crystal type antenna device or a non-liquid crystal type antenna device, and the sensing device may be a sensing device for sensing capacitance, light, thermal energy or ultrasonic waves, but not limited thereto. The tiled device may be, for example, a display tiled device or an antenna tiled device, but not limited thereto. It should be noted that the electronic device may be any permutation and combination of the aforementioned, but not limited thereto. In addition, the electronic device may be a bendable or flexible electronic device. It should be noted that the electronic device may be any permutation and combination of the aforementioned, but not limited thereto. In addition, the shape of the electronic device may be rectangular, circular, polygonal, with curved edges, or other suitable shapes. The electronic device may have peripheral systems such as a drive system, a control system, a light source system, a shelf system, etc. to support a display device, an antenna device or a tiled device.

It is noted that the following are exemplary embodiments of the present disclosure, but the present disclosure is not limited thereto, while a feature of some embodiments can be applied to other embodiments through suitable modification, substitution, combination, or separation. In addition, the present disclosure can be combined with other known structures to form further embodiments.

Unless otherwise defined, all terms (including technical and scientific terms) used herein have the same meaning as commonly understood by those skilled in the art related to the present disclosure. It can be understood that these terms, such as those defined in commonly used dictionaries, should be interpreted as having meaning consistent with the relevant technology and the background or context of the present disclosure, and should not be interpreted in an idealized or excessively formal way. Unless there is a special definition in the embodiment of the present disclosure.

In addition, descriptions such as "when . . . " or "while" in the present disclosure refer to aspects such as "at the moment, before or after", but not limited to situations that occur at the same time. Similar descriptions such as "disposed on" in the present disclosure indicate the corresponding positional relationship between two components, but not limited to whether there is contact between the two components, unless otherwise specified. Furthermore, when multiple effects are provided in the present disclosure, if the word "or" is used between the effects, it means that the effects may exist independently, but it does not exclude that multiple effects may exist at the same time.

The heat source detection system disclosed in the present disclosure may be applied, for example, to public transportation, while it is not limited thereto. The public transportation includes the use of transportation vehicles, where the type of transportation vehicle may include buses, self-driving cars, taxis, MRT, high-speed rail, trains, subways, airplanes or ships, while it is not limited thereto.

FIG. 1 is a system architecture diagram of a heat source detection system 1 according to an embodiment of the present disclosure. As shown in FIG. 1, the heat source detection system 1 includes at least one infrared light detector 10, at least one visible light detector 20 and a processing unit 30. In one embodiment, the heat source detection system 1 may further include a storage device 40. In addition, in one embodiment, the heat source detection system 1 may further include a control unit 50.

First, the infrared light detector 10 will be described. The infrared light detector 10 may be used to acquire infrared light images. In one embodiment, the type of the infrared light detector 10 may include, for example, an infrared thermal imaging camera, but it is not limited thereto. In one embodiment, the infrared light detector 10 may be equipped with a sensing element, where the type of the sensing element may include a long wave infrared (LWIR) sensing element. In other embodiments, the type of the sensing element may also include a short wave infrared (SWIR) sensing element, a middle wave infrared (MWIR) sensing element, a near infrared (NIR) sensing element or a far infrared sensing element, etc., while it is not limited thereto. With different types of sensing elements, the detection range of the infrared light detector 10 will also be different. The "detection range" here may, for example, refer to the range within the maximum distance and maximum angle that can be detected, while it is not limited thereto.

In one embodiment, the infrared light detector 10 may correspond to a wavelength range; that is, the infrared light detector 10 may detect infrared light belonging to the wavelength range. In one embodiment, the wavelength range corresponding to the infrared light detector 10 may be, for example, between 6 and 16 micrometers (6 μm≤wavelength range≤15 μm), while it is not limited thereto. In one embodiment, the wavelength range corresponding to the infrared light detector 10 may be, for example, between 7 and 15 micrometers (7 μm≤wavelength range≤15 μm), while it is not limited thereto. In one embodiment, the wavelength range corresponding to the infrared light detector 10 may be, for example, between 8 and 14 micrometers (8 μm≤wavelength range≤14 μm), while it is not limited thereto.

In one embodiment, the infrared light detector 10 may have a detection range, which may be defined as the farthest distance that the infrared light detector 10 can detect. In one embodiment, the detection distance may be within 35 meters (detection distance≤35 m), but it is not limited thereto. In one embodiment, the detection distance may be within 30 meters (detection distance≤30 m), but it is not limited thereto. In one embodiment, the detection distance may be within 25 meters (detection distance≤25 m), but it is not limited thereto.

In one embodiment, the infrared light detector 10 has a detection angle; for example, the infrared light detector 10 may detect infrared light within the detection angle. In one embodiment, the detection angle may be between 40 and 140 degrees (40 degrees≤detection angle≤140 degrees), while it is not limited thereto. In one embodiment, the detection angle may be between 50 and 130 degrees (50 degrees≤detection angle≤130 degrees), while it is not limited thereto. In one embodiment, the detection angle may be between 60 and 120 degrees (60 degrees≤detection angle≤120 degrees), while it is not limited thereto. In one embodiment, the detection angle is 60 degrees; for example, when the center of the infrared light detector 10 is set to 0 degrees, the infrared light detector 10 may detect infrared light ranging from 0 degrees to plus 30 degrees and infrared light within 0 degrees to minus 30 degrees, and so on, while it is not limited thereto.

In one embodiment, when the heat source detection system 1 is applied to public transportation, the installation location of the infrared light detector 10 may include: the waiting area of the transportation vehicle (for example, on any object that can be installed in the waiting area), outside the transportation vehicle itself (for example, on the side or the front of the vehicle) or inside the transportation vehicle, or a combination thereof, while it is not limited thereto.

Next, the visible light detector 20 will be described. The visible light detector 20 may be used to acquire visible light images. In one embodiment, the type of visible light detector 20 may include various types of cameras, but it is not limited thereto. In the present disclosure, the visible light detector 20 may be used as an "auxiliary" of the infrared light detector 10. For example, the visible light detector 20 may be activated when a specific condition is met, and maintained in an inactive state when the specific condition is not met. In this article, the "inactive state" includes, for example, shutdown (for example, power-off state) or standby (for example, low power consumption state), but it is not limited thereto, while "activated" includes, for example, starting from a shutdown, or returning from a standby state to a normal operating state and starting to acquire visible light images. In one embodiment, the visible light detector 20 may be disposed near the infrared light detector 10 to assist in capturing the visible light image corresponding to the infrared light image, but it is not limited thereto.

Figure 2:
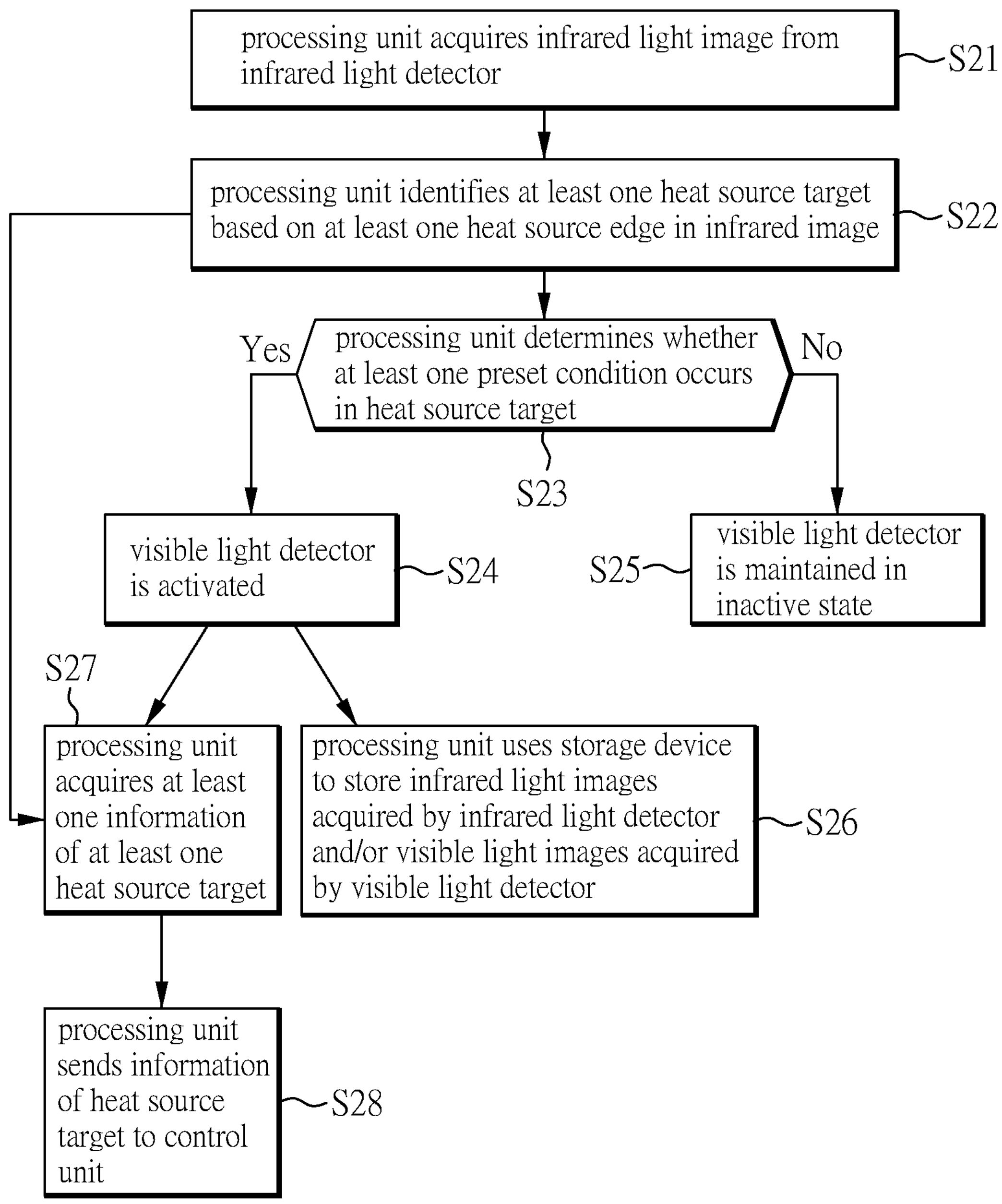
FIG. 2 is a main operation flow chart of the heat source detection system according to an embodiment of the present disclosure.

Next, the processing unit 30 and the storage device 40 will be described. The processing unit 30 may be used to analyze and process the infrared light image acquired by the infrared light detector 10 or the visible light image acquired by the visible light detector 20, while it is not limited thereto. In one embodiment, the storage device 40 may store at least one instruction 42, and the processing unit 30 may execute the instruction 42. When the processing unit 30 executes the instruction 42, the processing unit 30 may perform special operations to achieve special functions (as shown in FIG. 2 and will be described in subsequent paragraphs). In one embodiment, the processing unit 30 may, for example, include a physical processor that may execute software or firmware, but may also include a virtual processor in the form of software, while it is not limited thereto. In one embodiment, the storage device 40 may, for example, include a non-transitory computer-readable medium, wherein the "non-transitory computer-readable medium" may include, for example, a memory, a hard disk, a flash drive, a virtual disk, memory, cloud drive or other devices with similar functions, while it is not limited thereto. Furthermore, in one embodiment, the instruction 42 may be in the form of software or firmware, for example, but it is not limited thereto. In one embodiment, when the heat source detection system 1 is applied in the field of public transportation, the processing unit 30 and the storage device 40 may be installed in a cloud server, but may also be installed in an infrared light detector or a visible light detector or the transportation vehicle itself, or may be installed on an object in the waiting area of the transportation vehicle, while it is not limited thereto. In one embodiment, the heat source detection system 1 may have a plurality of processing units 30, which may be disposed at different locations, but it is not limited thereto.

Next, the control unit 50 will be described. The control unit 50 may be used to control transportation vehicles, while it is not limited thereto. In one embodiment, the control unit 50 may, for example, include a controller or a processor (different from the processing unit 30). In another embodiment, the control unit 50 may also include software or firmware executed by a controller or processor, but it is not limited thereto. In one embodiment, when the transportation vehicle is in a non-self-driving mode, the control unit 50 may be disposed on the transportation vehicle. In another embodiment, when the transportation vehicle is in an autonomous driving mode, the control unit 50 may be installed in a driving control center, wherein the driving control center may remotely send instructions to the transportation vehicle, while it is not limited thereto.

Next, the operations performed by the processing unit 30 when executing the instruction 42 will be described. FIG. 2 is a main operation flow chart of the heat source detection system 1 according to an embodiment of the present disclosure, and please also refer to FIG. 1 as a reference. As shown in FIG. 2, the basic operation performed by the processing unit 30 according to the instruction 42 may include steps S21 to S25.

First, step S21 is executed, wherein the processing unit 30 acquires an infrared light image from the infrared light detector 10. At this moment, the visible light detector 20 may be in an inactive state. Then, step S22 is executed, in which the processing unit 30 identifies at least one heat source target in the infrared image based on at least one heat source edge in the infrared image. Then, step S23 is executed, in which the processing unit 30 determines whether at least one preset condition occurs in the heat source target. When the preset condition occurs in the heat source target, step S24 is executed, in which the processing unit 3 activates the visible light detector 20. When the preset condition does not occur in the heat source target, step S25 is executed, in which the processing unit 3 maintains the visible light detector 20 in an inactive state.

Regarding step S21, in one embodiment, the infrared light detector 10 may be set to activate and detect for a long time, but in another embodiment, the infrared light detector 10 may also be activated under specific conditions (for example, referring to the description of step S31 in FIG. 3B), wherein the activation period of the infrared light detector 10 is greater than the activation period of the visible light detector 10, and the infrared light detector 10 may be in a standby state or a shutdown state when it is not activated. In one embodiment, the number of infrared light detectors 10 of the heat source detection system 1 may be, for example, one or more. In the case of having a single infrared light detector 10, the processing unit 30 may directly analyze and process the infrared light image acquired by the infrared light detector 10, and in the case of having multiple infrared light detectors 10, the processing unit 30 may first integrate the infrared light images acquired by the multiple infrared light detectors (such as but not limited to using various image composing techniques), and then analyze and process the integrated infrared light image, but it is not limited thereto. In addition, in one embodiment, data transmission between the infrared light detector 10 and the processing unit 30 may be carried out through wired communication technology or wireless communication technology, but it is not limited thereto. It is noted that the above description is only an example but not a limitation.

Regarding step S22, in general, the infrared light detector 10 is based on temperature for image formation, so that each object in the infrared light image may appear as a heat source, and the contour of each object may appear as the edge of the heat source. In one embodiment, the processing unit 30 may identify the object (that is, the heat source target) according to the edge of the heat source. In one embodiment, the processing unit 30 may identify the attributes of the heat source target based on the size or shape of the edge of the heat source. The attributes may include, for example, adults, children, the elderly, pregnant women, people with disabilities, or objects, while it is not limited thereto. In one embodiment, the processing unit 30 may also identify whether the behavior of the heat source target changes in the continuously acquired infrared light images. The above identification may be achieved by various image recognition technologies. Since "how to identify" is not the focus of the present disclosure, it will not be described in detail. Moreover, it is noted that the above description is only an example but not a limitation.

Regarding step S23, In one embodiment, the at least one preset condition may include: the heat source edge of the heat source target is displaced, the heat source edge of the heat source target is deformed, the temperature of the heat source target changes drastically, or the temperature of the heat source target exceeds a threshold, or a combination thereof, while it is not limited thereto. For example, when the heat source edge of the heat source target is displaced, it indicates that the heat source target may move, and thus a clearer image may be needed, so that the visible light detector 20 may be activated. Alternatively, when the heat source edge of the heat source target is deformed, the temperature of the heat source target changes drastically, or the temperature of the heat source target exceeds a threshold, it indicates that the heat source target may be in an abnormal state, and thus a clearer image may be needed, so that it is suitable to activate the visible light detector 20. It is noted that the above description is only an example but not a limitation.

Regarding step S24, in one embodiment, when the processing unit 30 determines that there is a preset condition occurred in at least one heat source target, it indicates that it is necessary to acquire a visible light image to assist identification, so the processing unit 30 may activate the visible light detector 20 to assist detection. In one embodiment, the heat source detection system 1 may be equipped with one or more visible light detectors 20. In the case of having a single visible light detector 20, the processing unit 30 may directly perform analysis and processing based on the visible light image acquired by the visible light detector 20. In the case of having multiple visible light detectors 20, the processing unit 30 may integrate the visible light images acquired by the multiple visible light detectors 20 and perform analysis and processing based on the integrated visible light image. Furthermore, in one embodiment, the processing unit 30 may also integrate the infrared image and the visible light image, thereby acquiring the actual image corresponding to the heat source target from the visible light image, while it is not limited thereto. In addition, in one embodiment, data transmission between the visible light detector 20 and the processing unit 30 may be carried out through wired communication technology or wireless communication technology, so that the processing unit 30 may send instructions to activate the visible light detector 20, but it is not limited thereto. In addition, in one embodiment, the processing unit 30 for analyzing infrared light images and the processing unit 30 for determining whether to activate the visible light detector 20 may be, for example, the same processing unit, or may be different processing units, while it is not limited thereto. It is noted that the above description is only an example but not a limitation.

Regarding step S25, when the processing unit 30 determines that there is no preset condition occurred in the heat source target in the infrared light image, it indicates that each heat source target may be in a stationary state or has no abnormal state, and thus there is no need to acquire a visible light image, so that the visible light detector 20 may be maintained in the inactive state.

As a result, the heat source detection system 1 of the present disclosure may use the infrared light detector 10 as the main detector, and the visible light detector 20 as an auxiliary detector that is only activated under specific conditions, so as to save power consumption, or reduce the problem of affecting the privacy of the person being photographed, or reduce the number of visible light detectors 20, thereby reducing installation costs or maintenance costs. Therefore, the problems of the prior art can be overcome.

With reference to FIG. 2 again, the operation performed by the processing unit 30 according to the instruction 42 may also include more steps. In one embodiment, after step S24 is executed, step S26 may be executed, in which, when the processing unit 30 determines that a preset condition occurs in at least one heat source target, the processing unit 30 uses the storage device 40 to store the infrared light images acquired by the infrared light detector 10 and/or the visible light images acquired by the visible light detector 20.

Regarding step S26, when the processing unit 30 determines that a preset condition occurs in at least one heat source target, it indicates that the current infrared light image and/or visible light image may need to be saved, so that the storage device 40 may store the infrared light image and/or visible light image. In one embodiment, the storage device 40 may store infrared light images and/or visible light images for a preset period of time, wherein the length of the period of time may be adjusted according to user needs, while it is not limited thereto.

As a result, the heat source detection system 1 may store infrared light images and/or visible light images when the preset condition occurs in the heat source target, but does not store infrared light images and/or visible light images when the preset condition does not occur in the heat source target, so as to save storage space, or reduce power consumption, or reduce the problem of affecting the privacy of the person being photographed, or avoid the problem in the prior art that it requires a lot of time and cost to search for a specific piece of monitoring record.

With reference to FIG. 2 again, the operation performed by the processing unit 30 according to the instruction 42 may also include more steps. In one embodiment, the operation may also include steps S27 and S28. After the processing unit 30 identifies the heat source target in the infrared light image (for example, after step S22 or step S24 is executed), step S27 may be executed, in which the processing unit 30 acquires at least one information of at least one heat source target. Then, step S28 may be executed, in which the processing unit 30 sends the information of the heat source target to the control unit 50, wherein the control unit 50 may provide a control signal according to the information of the heat source target.

Regarding step S27, in one embodiment, the information of the heat source target may include: attributes of the heat source target (such as but not limited to adults, children, the elderly, pregnant women, people with disabilities, or objects), the number of heat source targets, the behavior of the heat source target, or the temperature of the heat source target, or a combination thereof, while it is nor limited thereto. It is noted that the information of the heat source target may be used for subsequent processing, and the part of the subsequent processing will be explained in the subsequent paragraphs with reference to FIG. 3A to FIG. 5C.

Regarding step S28, in one embodiment, when the control unit 50 acquires the information of the heat source target provided by the processing unit 30, the control unit 50 may generate a control signal according to the information of the heat source target, wherein the control signal may be used to control the transportation vehicle, or to control the equipment on the transportation vehicle, for example, to control the bus stop or start of transportation vehicle, control the timing of transportation vehicle, control the broadcasting equipment or display equipment of transportation vehicle, adjust the air conditioning of the transportation vehicle, or control other achievable actions, etc. while it is not limited thereto.

Through the execution of steps S27 and S28, the heat source detection system 1 may provide special functions in various application scenarios. Next, the details of the application of the heat source detection system 1 in multiple application scenarios will be described.

Figures 3A, 3B:
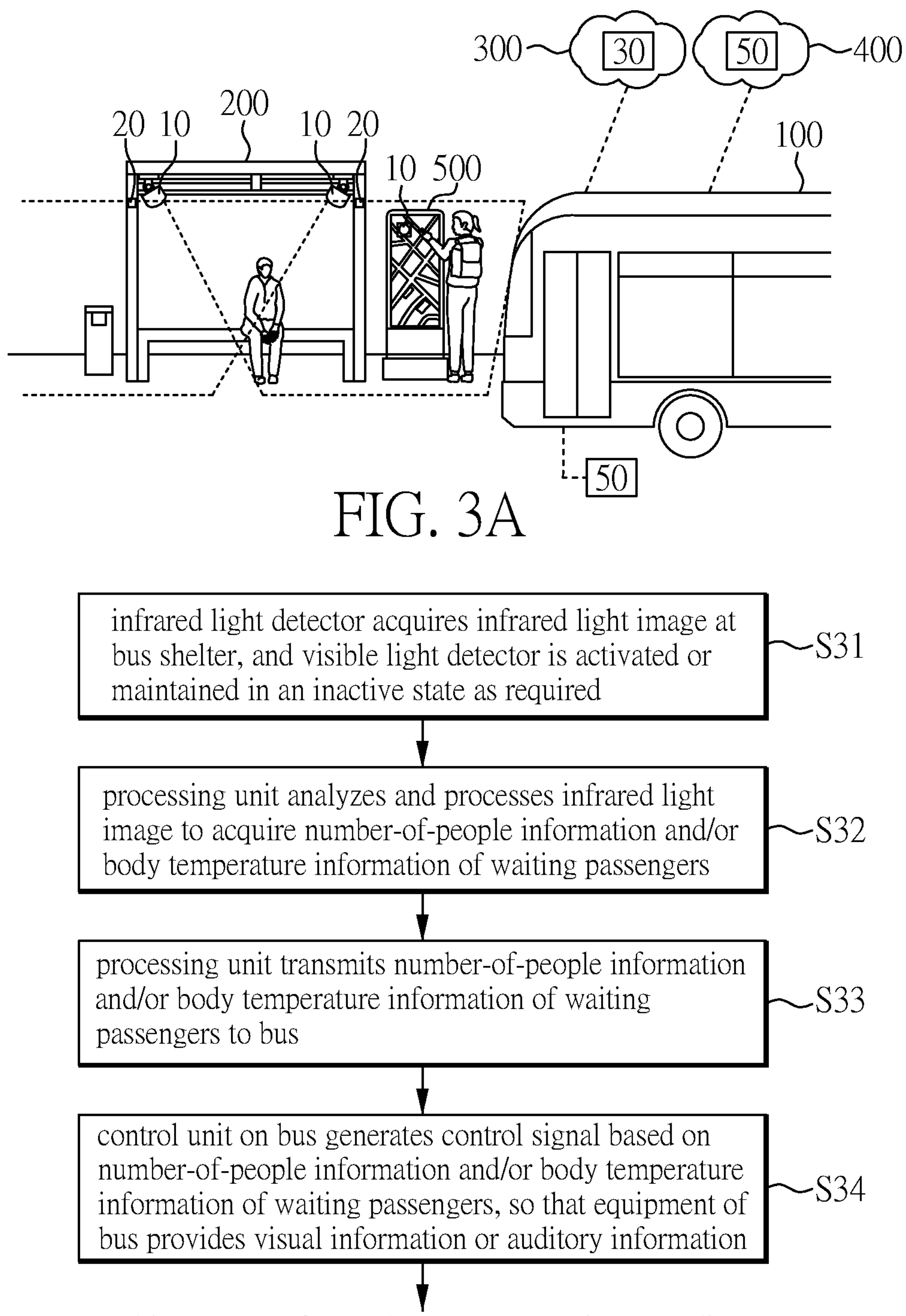
FIG. 3A is a schematic diagram of the application scenario of the heat source detection system according to the first embodiment of the present disclosure.
FIG. 3B is an operation flow chart of the heat source detection system corresponding to the application scenario of FIG. 3A.
Figures 3C, 4A:
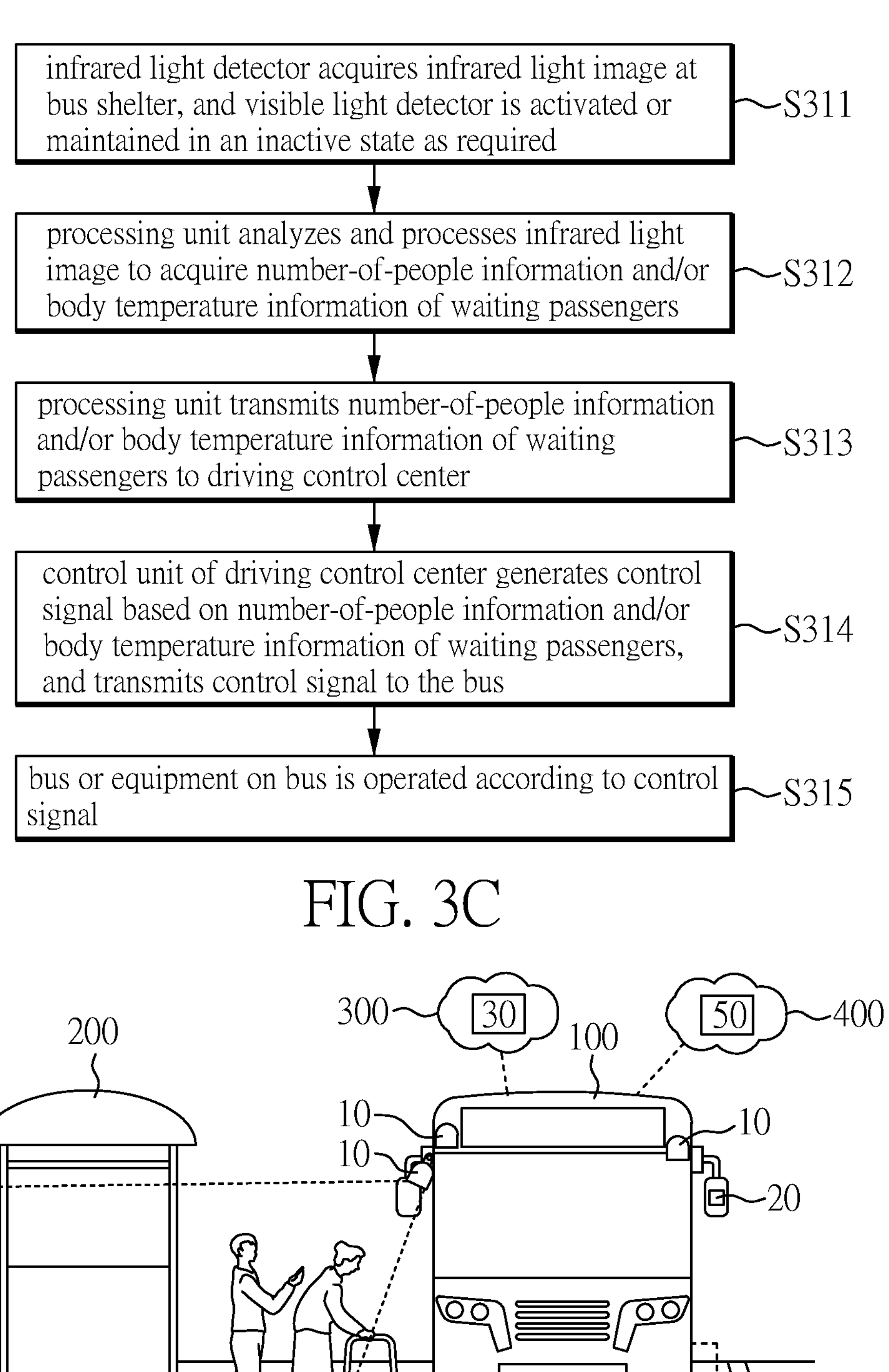
FIG. 3C is another operation flow chart of the heat source detection system corresponding to the application scenario of FIG. 3A.
FIG. 4A is a schematic diagram of the application scenario of the heat source detection system according to the second embodiment of the present application.

Please refer to FIG. 3A to FIG. 3C, as well as FIG. 1 to FIG. 2 as a reference. FIG. 3A is a schematic diagram of the application scenario of the heat source detection system 1 according to the first embodiment of the present disclosure, and FIG. 3B is an operation flow chart of the heat source detection system 1 corresponding to the application scenario of FIG. 3A. FIG. 3C is another operation flow chart of the heat source detection system 1 corresponding to the application scenario in FIG. 3A. In the examples of FIG. 3A to FIG. 3C, the transportation vehicle is a bus 100, the waiting area is a bus shelter 200, and the heat source detection system 1 is used to detect waiting passengers at the bus shelter 200.

As shown in FIG. 3A, the infrared light detector 10 may be installed at the bus shelter 200. The processing unit 30 and the storage device 40 may be installed on a cloud server 300, but may also be installed on the infrared light detector 10 or the bus 100. The control unit 50 may be provided on the bus 100 or in a driving control center 400. In addition, the visible light detector 20 may be disposed near the infrared light detector 10. In addition, in one embodiment, the bus shelter 200 may be equipped with an electronic signage 500 for displaying bus information or advertisements. It is noted that as long as the technology is feasible, the infrared light detector 10 may also be integrated into the electronic signage 500, while it is not limited thereto.

Next, the operation flow of FIG. 3B will be described. In the example of FIG. 3B, the heat source detection system 1 may be used to detect the body temperature of passengers waiting for the bus 100, and the bus 100 is a non-self-driving bus. In this case, the control unit 50 may be installed on the bus 100. As shown in FIG. 3B, step S31 is first executed, in which the infrared light detector 10 acquires the infrared light image at the bus shelter 200, and the visible light detector 20 may be activated or maintained in an inactive state as required. Then, step S32 is executed, in which the processing unit 30 analyzes and processes the infrared light image to acquire the number-of-people information and/or body temperature information of the waiting passengers from the infrared light image, while it is not limited thereto. Then, step S33 is executed, in which the processing unit 30 transmits the number-of-people information and/or body temperature information of the waiting passengers to the bus 100. Then, step S34 is executed, in which the control unit 50 on the bus 100 may generate a control signal based on the number-of-people information and/or body temperature information of the waiting passengers, so that the equipment of the bus 100 provides visual information or auditory information to notify the driver. Then, the heat source detection system 1 may provide at least one reference indication so that the driver may perform subsequent processing related to the number-of-people information and/or body temperature information of the waiting passengers based on the reference indication.

In step S31, the infrared light detector 10 may acquire an infrared light image within a specific range. In one embodiment, the specific range may, for example, include the detection distance and detection angle of the infrared light detector 10. The detection range is, for example, a detection distance of 5 to 10 meters, and a detection angle of 60 degrees to 120 degrees, but it is not limited thereto. In addition, the visible light detector 20 may be activated according to the steps of FIG. 2, but it is not limited thereto.

In steps S32 to S34, the processing unit 30 may identify the attributes and/or behaviors of the heat source target in the infrared light image, thereby distinguishing the heat source target as passengers or objects, and then acquiring the number-of-people information and body temperature information of the waiting passengers. In addition, after the control unit 50 receives the number-of-people information and body temperature information, it may generate a control signal to control the broadcasting equipment or display of the bus 100 to notify the driver of the number-of-people information and body temperature information. In addition, in one embodiment, when the processing unit 30 is disposed on the bus 100, the processing unit 30 and the control unit 50 may be integrated together.

After step S34 is executed, in one embodiment, the processing unit 30 or the control unit 50 of the heat source detection system 1 may provide reference indications to the driver through the equipment of the bus 100, so that the driver may perform subsequent processing according to the reference indication. For example, when the reference indication is related to the number-of-people information of the waiting passengers, the reference indication may be used to instruct actions such as adjusting the air conditioner, adjusting the parking time, or broadcasting a notification to the passengers in the car to move inside, while it is not limited thereto. Alternatively, when the reference indication is related to the body temperature information of the waiting passengers, if there is a passenger with high body temperature, the reference indication may be used to instruct the driver to perform, for example, asking the passenger with high temperature to measure the temperature again when getting on the bus, asking the passenger with high body temperature to implement his/her own protection mechanism, deciding whether to continue driving, asking the passenger with high body temperature to register his/her information with real name, or notifying relevant health units, etc., but it is not limited thereto. The reference indication may be presented in the form of audio or video, for example, but not limited thereto. In addition, in another embodiment, after step S34 is executed, the heat source detection system 1 may not give a reference indication, but the driver may perform subsequent processing based on the visual information or auditory information generated in step S34, while it is not limited thereto.

Next, the operation flow of FIG. 3C will be described. In the example of FIG. 3C, the heat source detection system 1 may be used to detect the number-of-people information and/or body temperature information of the waiting passengers, wherein the bus 100 is a self-driving bus and, in this case, the control unit 50 is disposed in the driving control center 400. As shown in FIG. 3C, step S311 is first executed, in which the infrared light detector 10 acquires the infrared light image at the bus shelter 200, and the visible light detector 20 may be activated or maintained in an inactive state as required. Then, step S312 is executed, in which the processing unit 30 analyzes and processes the infrared light image to acquire the number-of-people information and/or body temperature information of the waiting passengers. Then, step S313 is executed, in which the processing unit 30 transmits the number-of-people information and/or body temperature information of the waiting passengers to the driving control center 400. Then, step S314 is executed, in which the control unit 50 of the driving control center 400 generates a control signal based on the number-of-people information and/or body temperature information of the waiting passengers, and transmits the control signal to the bus 100. Then, step S315 is executed, in which the bus 100 or the equipment on the bus 100 is operated according to the control signal.

The description of the example of FIG. 3B may be applicable to most of the example of FIG. 3C, and thus the following description mainly focuses on the differences. In steps S313 to S315, the driving control center 400 may, for example, include a cloud control center that may control the self-driving bus 100 through wireless communication. In one embodiment, the driving control center 400 may control the bus 100 through a computer or a manual operation method, while it is not limited thereto. In one embodiment, the driving control center 400 may cause the control unit 50 to send a control signal to the bus 100 for adjusting the air conditioner based on the number-of-people information of the waiting passengers, but it is not limited thereto. In one embodiment, when there is a passenger with high body temperature among the waiting passengers, the driving control center 400 may cause the control unit 50 to transmit a control signal to the bus 100 to control the broadcasting equipment or display device of the bus 100 to play a message to remind the waiting passenger with high body temperature, for example, asking for measuring the body temperature again or implementing self-protection mechanisms, or the control signal may also cause the bus 100 to stop driving or cause the bus 100 to automatically notify the relevant health unit. Alternatively, when the bus 100 is installed with a passenger interactive device (not shown), the control signal may also cause the passenger interactive device to provide a real-name registration page for passengers to register, while it is not limited thereto.

Thus, the heat source detection system 1 of the present disclosure may be applied to detect passengers waiting at the bus shelter 200. Through the mechanism that the visible light detector 20 is activated only when needed, it is able to save energy consumption, reduce installation costs or expenses, or reduce privacy issues.

Figure 4B:
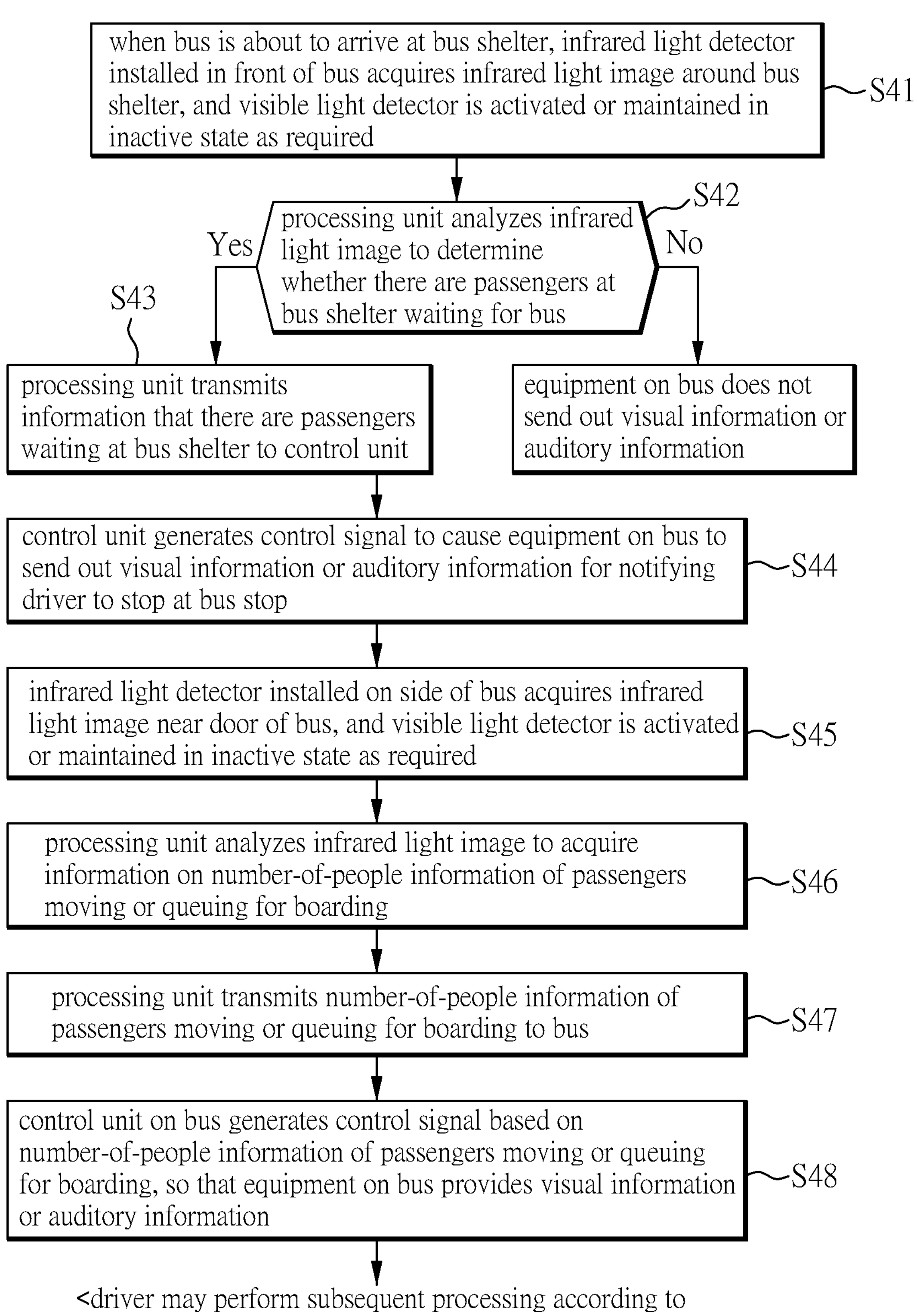
FIG. 4B is an operation flow chart of the heat source detection system corresponding to the application scenario of FIG. 4A.
Figure 4C:
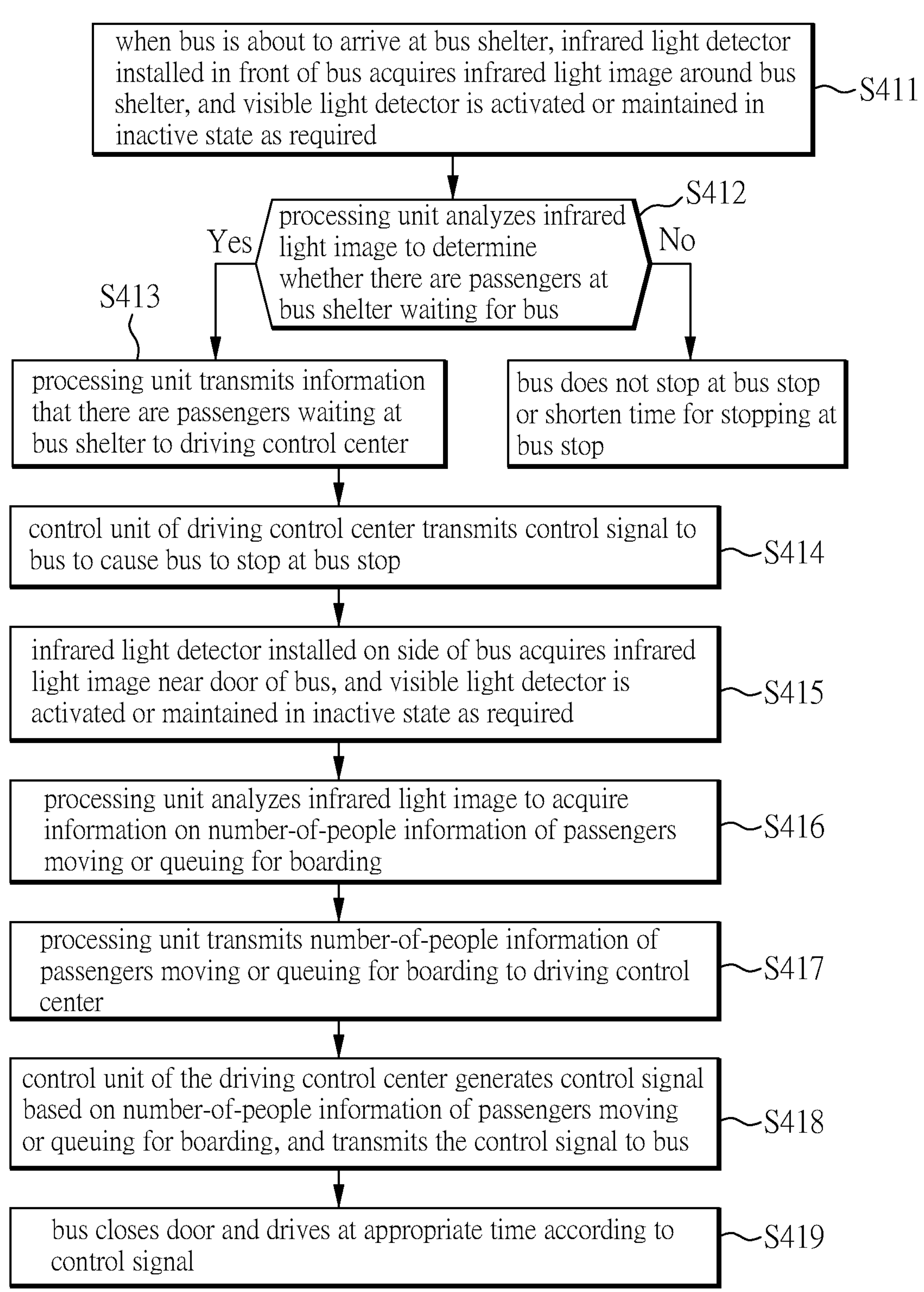
FIG. 4C is another operation flow chart of the heat source detection system corresponding to the application scenario of FIG. 4A.

Please refer to FIG. 4A to FIG. 4C, as well as FIG. 1 to FIG. 3C as a reference. FIG. 4A is a schematic diagram of the application scenario of the heat source detection system 1 according to the second embodiment of the present application, FIG. 4B is an operation flow chart of the heat source detection system 1 corresponding to the application scenario of FIG. 4A, and FIG. 4C is another operation flow chart of the heat source detection system 1 corresponding to the application scenario of FIG. 4A, wherein, in FIG. 4A to FIG. 4C, the transportation vehicle is exemplified by a bus 100 and the heat source detection system 1 is used to detect passengers queuing for boarding when the bus 100 arrives.

As shown in FIG. 4A, one or more infrared light detectors 10 may be disposed on the outside of the bus 100, such as the front and the side. The processing unit 30 and the storage device 40 may be installed on the cloud server 300, but may also be installed on the infrared light detector 10 or the bus 100. The control unit 50 may be installed on the bus 100 or the driving control center 400. The visible light detector 20 may be disposed near the infrared light detector 10.

Next, the operation flow of FIG. 4B will be described. In the example of FIG. 4B, the heat source detection system 1 may be used to detect the number of people queuing for boarding. The bus 100 is a non-self-driving bus. In this case, the control unit 50 may be installed on the bus 100.

As shown in FIG. 4B, step S41 is executed first, in which, when the bus 100 is about to arrive at the bus shelter 200 (for example, when the distance between the bus 100 and the bus shelter 200 is shortened to a specific distance), the infrared light detector 10 installed in front of the bus 100 acquires the infrared light image around the bus shelter 200, and the visible light detector 20 may be activated or maintained in an inactive state as required. Then, step S42 is executed, in which the processing unit 30 analyzes the infrared light image to determine whether there are passengers at the bus shelter 200 waiting for the bus. When the processing unit 30 determines that there are passengers waiting at the bus shelter 200, step S43 is executed, in which the processing unit 30 transmits the information that there are passengers waiting at the bus shelter 200 to the control unit 50. Then step S44 is executed, in which the control unit 50 generates a control signal to cause the equipment on the bus 100 to send out visual information or auditory information, thereby notifying the driver to stop at the bus stop. On the contrary, when the processing unit 30 determines that there are no waiting passengers at the bus shelter 200, the equipment on the bus 100 may not send out visual information or auditory information. Then step S45 is executed, in which, when the bus 100 pulls into the bus stop, the infrared light detector 10 installed on the side of the bus 100 acquires the infrared light image near the door of the bus 100. The visible light detector 20 may be activated or maintained in an inactive state as required. Then, step S46 is executed, in which the processing unit 30 analyzes the infrared light image to acquire information on the number-of-people information of passengers moving or queuing for boarding. Then, step S47 is executed, in which the processing unit 30 transmits the number-of-people information of passengers moving or queuing for boarding to the bus 100. Then, step S48 is executed, in which the control unit 50 on the bus 100 generates a control signal based on the number-of-people information of passengers moving or queuing for boarding, so that the equipment on the bus 100 provides visual information or auditory information to notify the driver. Then, the driver may perform subsequent processing related to the number-of-people information of passengers moving or queuing for boarding based on the reference indication provided by the heat source detection system 1. The details of steps S41 to S48 are described below.

In step S41, in consideration of the driving speed of the bus 100, the infrared light detector 10 may start to acquire the infrared light image when the bus 100 is still a certain distance away from the bus shelter 200, thereby avoiding the risk that the infrared light detector 10 has no time to detect part of the image due to excessively high vehicle speed. In one embodiment, the "specific distance" may be, for example, between 50 and 100 meters (50 m≤specific distance≤100 m), while it is not limited thereto. In one embodiment, the distance information between the bus 100 and the bus shelter 200 may be acquired through a navigation device or a positioning device, but the present disclosure may also acquire the distance information between the bus 100 and the bus shelter 200 through other methods, for example, installing appropriate distance detectors and other components in front of the bus 100, but it is not limited thereto. In addition, in one embodiment, the visible light detector 20 may be activated according to the steps of FIG. 2, but it is not limited thereto. In another embodiment, the visible light detector 20 may be installed on the bus 100, so that the driver may also manually control whether the visible light detector 20 is activated or not, but it is not limited thereto.

In steps S42 to S44, the processing unit 30 may determine whether the heat source target is a waiting passenger based on the behavior of the heat source target in the infrared image, such as whether there is a queuing behavior or a standing position, while it is not limited thereto. In addition, if the processing unit 30 determines that there are no passengers waiting at the bus shelter 200, the processing unit 30 may not send information to the control unit 50, or the control unit 50 may not generate a control signal. At this moment, the driver may decide whether to park at the bus shelter 200 or not. In addition, if the processing unit 30 is installed on the bus 100, the processing unit 30 may also be integrated with the control unit 50.

In step S45, the infrared light detector 10 may be installed on the side of the bus 100 according to its detection range to facilitate acquiring the infrared light image at the door. The detection range may be illustrated by referring to the previous embodiment. It is noted that a plurality of infrared light detectors 10 may be installed on the side of the bus 100 according to actual needs to expand the range of the infrared light image, while it is not limited thereto.

In steps S46 to S48, in one embodiment, the broadcasting equipment of the bus 100 may play information to inform the driver of the number of people queuing for boarding, or the display device of the bus 100 may play the image at the door (in this case, the visible light image may be used), while it is not limited thereto. In addition, when learning the information about the passengers queuing for boarding, the bus driver may close the door or drive according to the reference indication, or may decide the time to close the door and drive on his/her own, while it is not limited thereto.

Next, the operation flow of FIG. 4C will be described. In the example of FIG. 4C, the heat source detection system 1 may be used to detect the number of people queuing to board the bus 100, wherein the bus 100 is a self-driving bus.

As shown in FIG. 4C, step S411 is executed first, in which, when the bus 100 is about to arrive at the bus shelter 200, the infrared light detector 10 installed in front of the bus 100 acquires the infrared light image around the bus shelter 200, and the visible light detector 20 may be activated or maintained in an inactive state as required. Then, step S412 is executed, in which the processing unit 30 analyzes the infrared light image to determine whether there are passengers at the bus shelter 200 waiting for the bus. When the processing unit 30 determines that there are passengers waiting at the bus shelter 200, step S43 is executed, in which the processing unit 30 transmits the information that there are passengers waiting at the bus shelter 200 to the driving control center 400. Then step S414 is executed, in which the control unit 50 of the driving control center 400 transmits a control signal to the bus 100 to cause the bus 100 to stop at the bus stop. On the contrary, when the processing unit 30 determines that there are no waiting passengers at the bus shelter 200, the bus 100 may not stop at the bus stop, or shorten the time for stopping at the bus stop, while it is not limited thereto. Then, step S415 is executed, in which, when the bus 100 stops, the infrared light detector 10 installed on the side of the bus 100 acquires the infrared light image near the door of the bus 100, wherein the visible light detector 20 may be activated or maintained in an inactive state as required. Then, step S416 is executed, in which the processing unit 30 analyzes the infrared light image to acquire the number-of-people information of passengers moving or queuing for boarding. Then, step S417 is executed, in which the processing unit 30 transmits the number-of-people information of passengers moving or queuing for boarding to the driving control center 400. Then, step S418 is executed, in which the control unit 50 of the driving control center 400 generates a control signal based on the number-of-people information of passengers moving or queuing for boarding, and transmits the control signal to the bus 100. Then, step S419 is executed, in which the bus 100 closes the door and drives at an appropriate time according to the control signal.

The description of the example of FIG. 4B may be applicable to the example of FIG. 4C, and thus the following description mainly focuses on the differences. In one embodiment, the driving control center 400 may, for example, include a cloud control center that can control the self-driving bus 100 through wireless communication. In one embodiment, the driving control center 400 may control the bus 100 through a computer or a manual operation method, while it is not limited thereto. In one embodiment, when the processing unit 30 or the driving control center 400 determines that there are no passengers queuing for boarding at the door of the bus, the control unit 50 may send a control signal of door closing and driving to the bus 100, but it is not limited thereto. In addition, in one embodiment, the driving control center 400 may also cause the control unit 50 to send a control signal for adjusting the air conditioner to the bus 100 based on the number-of-people information of passengers queuing for boarding and the number-of-people information of passengers in the bus, while it is not limited thereto.

As a result, the heat source detection system 1 may be used to detect passengers queuing for boarding. Through the mechanism that the visible light detector 20 is activated only when needed, it is able to save energy consumption, reduce installation costs or expenses, or reduce privacy issues.

Figure 5C:
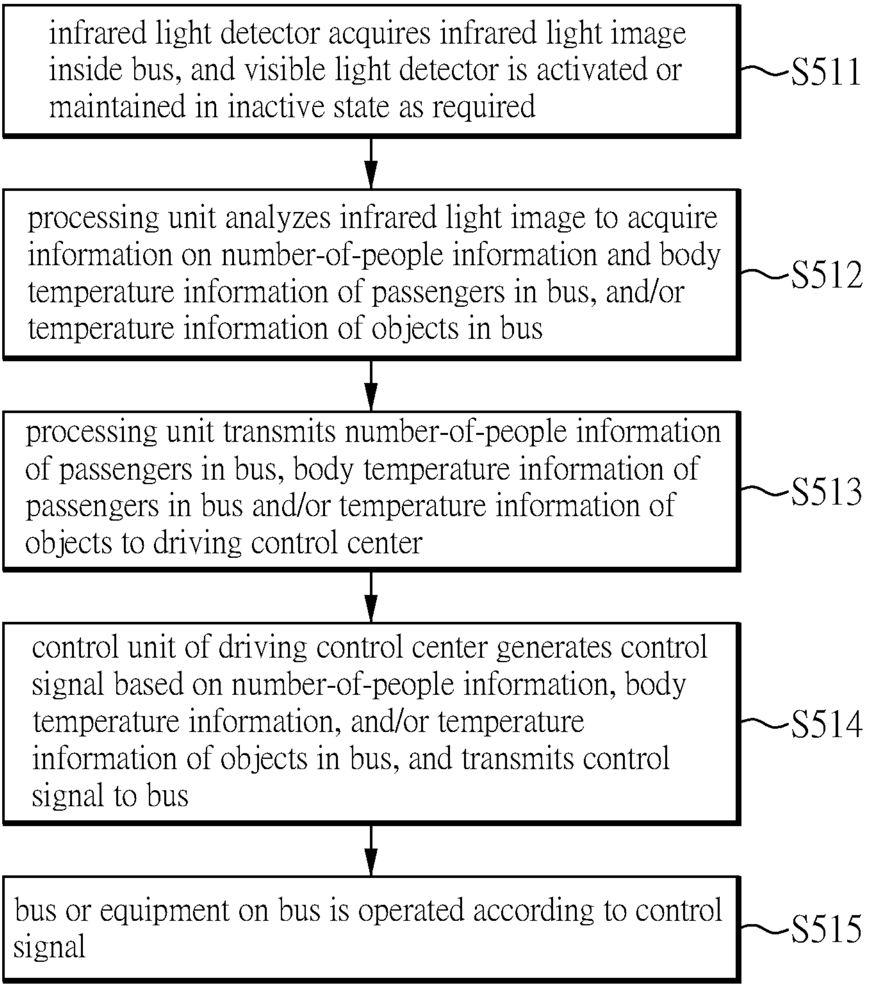
FIG. 5C is another operation flow chart of the heat source detection system corresponding to the application scenario of FIG. 5A.

Please refer to FIG. 5A to FIG. 5C, as well as FIG. 1 to FIG. 4C as a reference. FIG. 5A is a schematic diagram of the application scenario of the heat source detection system 1 according to the third embodiment of the present disclosure, FIG. 5B is an operation flow chart of the heat source detection system 1 corresponding to the application scenario of FIG. 5A, and FIG. 5C is another operation flow chart of the heat source detection system 1 corresponding to the application scenario of FIG. 5A, wherein, in the examples of FIG. 5A to FIG. 5C, the transportation vehicle is a bus 100 and the heat source detection system 1 is used to detect passengers and objects in the bus 100, for example.

As shown in FIG. 5A, one or more infrared light detectors 10 may be installed in the bus 100, and the position of each infrared light detector 10 may be adjusted according to the detection range so as to easily acquire images of passengers and objects in the bus. In addition, in one embodiment, in the bus 100, there may be provided with one or more display panels, which may be used as electronic signboards or video playback devices. In this case, as long as the technology is feasible, the infrared light detector 10 may also be installed on these display panels, while it is not limited thereto. The processing unit 30 and the storage device 40 may be installed on the cloud server 300, but may also be installed on the infrared light detector 10 or the bus 100. The control unit 50 may be installed on the bus 100 or the driving control center 400, but it is not limited thereto. The visible light detector 20 may be disposed near the infrared light detector 10.

Next, the operation flow of FIG. 5B will be described. In the example of FIG. 5B, the heat source detection system 1 may be used to detect the number-of-people information and body temperature information of passengers in the bus 100, or may detect the temperature of objects in the bus 100, where the bus 100 is a non-self-driving bus. At this moment, the control unit 50 may be installed on the bus 100.

As shown in FIG. 5B, step S51 is executed first, in which the infrared light detector 10 acquires the infrared light image inside the bus 100, and the visible light detector 20 may be activated or maintained in an inactive state as required. Then, step S52 is executed, in which the processing unit 30 analyzes the infrared light image to acquire information on the number-of-people information and body temperature information of passengers in the bus, and/or temperature information of objects in the bus. Then, step S53 is executed, in which the processing unit 30 transmits the number-of-people information of passengers in the bus, the body temperature information of passengers in the bus and/or the temperature information of objects to the bus 100. Then, step S54 is executed, in which the control unit 50 on the bus 100 generates a control signal based on the number-of-people information, body temperature information and/or temperature information of objects in the bus, so that the equipment of the bus 100 provides visual information or auditory information to notify the driver. Then, the driver may perform subsequent processing related to the number-of-people information, body temperature information and/or temperature information of objects in the vehicle according to the reference indication provided by the heat source detection system 1.

Since the descriptions of the foregoing embodiments are applicable to the operations of the infrared light detector 10, the visible light detector 20, the processing unit 30 and the control unit 50, the following description mainly focuses on the differences. In the example of FIG. 5B, when learning the number-of-people information, the driver may adjust the air conditioning equipment according to the number-of-people information according to the reference indication provided by the heat source detection system 1 (or decision), while it is not limited thereto. Alternatively, when learning the body temperature information, the driver may notify the passenger with excessively high body temperature based on the reference indication provided by the heat source detection system 1 (or his/her own decision), or ask passengers to register with real names, or proactively notify relevant health units, etc. while it is not limited thereto. In addition, in one embodiment, when there is an object with an excessively high temperature in the bus, it indicates that the object may be a dangerous object or has an abnormal state. Therefore, the driver may remind passengers in the bus to pay attention based on the reference indication provided by the heat source detection system 1 (or his/her own decision), or whether to stop to let the passengers get off, or notify relevant units, etc., while it is not limited thereto. In addition, in one embodiment, the processing unit 30 may compare the temperature of the object with a threshold (such as 50 degrees or 60 degrees, or a higher temperature, while it is not limited thereto). When it exceeds the threshold, the object may be determined to be dangerous or have an abnormal state; otherwise, the object is determined to be normal, while it is not limited thereto.

Next, the operation flow of FIG. 5C will be described. In the example of FIG. 5C, the heat source detection system 1 may be used to detect the number-of-people information and body temperature information of passengers in the bus 100, or to detect the temperature information of objects in the bus 100, wherein the bus 100 is a self-driving bus and the control unit 50 is provided in the driving control center 400.

As shown in FIG. 5C, step S511 is executed first, in which the infrared light detector 10 acquires an infrared light image inside the bus 100. The visible light detector 20 may be activated or maintained in an inactive state as required. Then, step S512 is executed, in which the processing unit 30 analyzes the infrared light image to acquire the number-of-people information of passengers, body temperature information of passengers, and/or temperature information of objects in the bus. Then, step S53 is executed, in which the processing unit 30 transmits the number-of-people information, body temperature information, and/or temperature information of objects in the bus to the driving control center 400. Then, step S514 is executed, in which the control unit 50 of the driving control center 400 generates a control signal based on the number-of-people information, the body temperature information, and/or the temperature information of objects in the bus, and transmits the control signal to the bus 100. Then, step S515 is executed, in which the bus 100 or the equipment on the bus 100 is operated according to the control signal.

Since the descriptions of the foregoing embodiments are applicable to the operations of the infrared light detector 10, the visible light detector 20, the processing unit 30 and the control unit 50, the following description mainly focuses on the differences. In the example of FIG. 5C, the bus 100 may automatically adjust the air conditioning equipment according to the control signal associated with the number-of-people information, but it is not limited thereto. In addition, the bus 100 may provide reminders through broadcasting equipment or display equipment based on control signals associated with body temperature information, or provide a real-name registration page for passengers to register, or proactively notify relevant health units, etc., while it is not limited thereto. In addition, in one embodiment, when there are objects with excessively high temperature in the bus, the bus may also issue a broadcast warning according to the control signal, or automatically stop to let passengers get off, or notify relevant units, etc., while it is not limited thereto. In addition, in one embodiment, the processing unit 30 may compare the temperature of the object with a threshold value. When it exceeds the threshold value, the object may be determined to be a dangerous object or has an abnormal state; otherwise, the object may be determined to be in a normal state, while it is not limited thereto.

As a result, the heat source detection system 1 may be used to detect passengers and objects in the bus. Through the mechanism that the visible light detector 20 is activated only when needed, it is able to save energy consumption, reduce installation costs or expenses, or reduce privacy issues.

It is noted that the various applications in the above scenarios are only examples. In fact, the present disclosure may be extended to more applications. For example, the infrared light detector 100 installed in front of the bus 100 may also be used to detect pedestrians or cars on the road to avoid visual blind spots. Moreover, for example, when the processing unit 30 determines that the passenger attributes are adults, children, elderly, etc., the present disclosure may also be extended to assist in determining whether the fare is correct or not when the passenger taps or swipes the ticket. Moreover, for example, when there are too many people waiting for the bus, the present disclosure may also be extended to assist the departure point in adding dispatch buses. Moreover, for example, when the bus 100 ends its mission and returns to the departure point, the infrared light detector 10 in the bus may also be used to monitor whether there are suspicious persons or the like inside the bus, but it is not limited thereto. In addition, as long as it is reasonable and feasible, the various processes in the above scenarios may be adjusted in order or may be increased or decreased according to needs.

In one embodiment of the present disclosure, an evidence may be provided by at least performing a comparison on a product through mechanism observation, such as the presence or absence of components or the operational relationship between components, so as to determine whether the product falls within the patent protection scope of the present disclosure, but not limited thereto. In one embodiment, the mechanism observation may be achieved, for example, by using the human eye or equipment such as an optical microscope or a scanning microscope, but not limited thereto. In addition, in one embodiment, the infrared light detector or visible light detector of the present disclosure may be compared based on the internal component structure, such as lens set, circuit board, shutter, outer frame, pixel structure or circuit layout, etc, and may be compared based on the functions corresponding to the present disclosure, while it is not limited thereto.

The details or features of the various embodiments of the present disclosure may be mixed and matched as long as they do not violate the spirit of the disclosure or conflict with each other.

As can be seen from the above embodiments, the heat source detection system 1 of the present disclosure may use the infrared light detector 10 as main detection and the visible light detector 20 as auxiliary detection, so as to solve the problem of the existing technology, or solve the problem of excessive power consumption, or solve the problem of high installation cost of the detector, or reduce the problem of privacy damage, but it is not limited thereto. In addition, the heat source detection system 1 of the present disclosure may be applied to non-self-driving or self-driving transportation vehicles, which may improve the efficiency of driving or passengers riding, or may improve driving safety.

The aforementioned specific embodiments should be interpreted as merely illustrative, and not limiting the rest of the present disclosure in any way, and the features of different embodiments may be mixed and matched as long as they do not conflict with each other.

The invention claimed is:

1. A heat source detection system, comprising: at least one infrared light detector; at least one visible light detector; and a processing unit, wherein the processing unit performs an operation according to at least one instruction, and the operation includes the steps of: acquiring an infrared light image from the at least one infrared light detector; identifying at least one heat source target based on at least one heat source edge in the infrared image; determining whether at least one preset condition occurs in the at least one heat source target;

wherein the at least one preset condition includes: the at least one heat source edge of the at least one heat source target is displaced, the at least one heat source edge of the at least one heat source target is deformed, a temperature of the at least one heat source target changes drastically, a temperature of the at least one heat source target exceeds a threshold; and activating the at least one visible light detector when the at least one preset condition occurs in the at least one heat source target.

2. The heat source detection system as claimed in claim 1, further comprising a storage device, wherein, when the at least one preset condition occurs in the at least one heat source target, the store device stores the infrared light image, a visible light image obtained by the at least one visible light detector, or the infrared light image and the visible light image.

3. The heat source detection system as claimed in claim 1, wherein the at least one infrared light detector includes a long wavelength infrared light sensing element.

4. The heat source detection system of claim 1, further comprising a control unit, and the operation performed by the processing unit further includes the steps of:

acquiring at least one information of the at least one heat source target; and transmitting the at least one information of the at least one heat source target to the control unit, wherein the control unit generates a control signal according to the at least one information of the at least one heat source target.

5. The heat source detection system as claimed in claim 4, wherein the at least one information of the at least one heat source target includes: a number of the at least one heat source target or a temperature of the at least one heat source target.

6. The heat source detection system as claimed in claim 4, wherein the at least one infrared light detection unit is installed in a bus shelter of a transportation vehicle.

7. The heat source detection system as claimed in claim 4, wherein the at least one infrared light detection unit is provided in a transportation vehicle.

8. The heat source detection system as claimed in claim 4, wherein the control unit is provided in a transportation vehicle, and the control signal is used to cause the transportation vehicle to provide visual information or auditory information.

9. The heat source detection system as claimed in claim 4, wherein the control unit is installed in a driving control center, and the driving control center transmits the control signal to a transportation vehicle, wherein the control signal is used to control the transportation vehicle or one or more equipment of the transportation vehicle.

10. The heat source detection system as claimed in claim 2, wherein the storage device includes a non-transitory computer-readable medium, and the at least one instruction is stored in the storage device.

11. The heat source detection system as claimed in claim 1, wherein an activation period of the at least one infrared light detector is greater than an activation period of the at least one visible light detector.

12. The heat source detection system as claimed in claim 1, wherein the processing unit identifies an attribute of the at least one heat source target based on a size or a shape of the at least one heat source edge.

13. The heat source detection system as claimed in claim 4, wherein the control signal is provided to control the transportation vehicle or control equipment on the transportation vehicle.

14. The heat source detection system as claimed in claim 6, wherein the transportation vehicle is a non-self-driving bus and the control unit is disposed on the bus, whereby the at least one infrared light detector acquires an infrared light image at the bus shelter, and the processing unit acquires number-of-people information, body temperature information, or number-of-people information and body temperature information of waiting passengers from the infrared light image for being transmitted to the bus, based on which the control unit generates a control signal, so that equipment of the bus provides visual information or auditory information.

15. The heat source detection system as claimed in claim 6, wherein the transportation vehicle is a self-driving bus and the control unit is disposed in a driving control center, whereby the at least one infrared light detector acquires an infrared light image at the bus shelter, and the processing unit acquires number-of-people information, body temperature information, or number-of-people information and body temperature information of waiting passengers, based on which the control unit generates a control signal for being transmitted to the bus, so that the bus or equipment of the bus provides visual information or auditory information.

16. The heat source detection system as claimed in claim 7, wherein the transportation vehicle is a non-self-driving bus and the control unit is disposed in the bus, whereby, when the bus is about to arrive at a bus shelter, the at least one infrared light detector acquires an infrared light image around the bus shelter, and the processing unit analyzes the infrared light image to determine that there are waiting passengers at the bus shelter and sends information that there are waiting passengers at the bus shelter to the control unit to generate a control signal, so that equipment of the bus sends visual information or auditory information to notify a driver to stop at a bus stop, and when the bus stops, the at least one infrared light detector acquires an infrared light image near a door of the bus, and the processing unit analyzes the infrared light image to acquire number-of-people information of passengers moving or queuing for boarding for being transmitted to the bus, based on which the control unit generates a control signal, so that equipment of the bus provides visual information or auditory information.

17. The heat source detection system as claimed in claim 7, wherein the transportation vehicle is an self-driving bus and the control unit is disposed in a driving control center, whereby, when the bus is about to arrive at a bus shelter, the at least one infrared light detector acquires an infrared light image around the bus shelter, and the processing unit analyzes the infrared light image to determine that there are waiting passengers at the bus shelter and sends information that there are waiting passengers at the bus shelter to the driving control center, based on which the control unit transmits a control signal to the bus so that the bus stops at a bus stop, and when the bus pulls into a bus stop, the at least one infrared light detector acquires an infrared light image near a door of the bus, and the processing unit analyzes the infrared light image to acquire number-of-people information of passengers moving or queuing for boarding for being transmitted to the driving control center, based on which the control unit generates a control signal for being transmitted to the bus, so that the bus closes the door and drives according to the control signal.

18. The heat source detection system as claimed in claim 7, wherein the transportation vehicle is a non-self-driving bus and the control unit is disposed in the bus, whereby the at least one infrared light detector acquires an infrared light image inside the bus, and the processing unit analyzes the infrared light image to acquire number-of-people information, body temperature information, or number-of-people information and body temperature information for being transmitted to the bus, based on which the control unit generates a control signal, so that equipment of the bus provides visual information or auditory information.

19. The heat source detection system as claimed in claim 7, wherein the transportation vehicle is a self-driving bus and the control unit is disposed in a driving control center, whereby the at least one infrared light detector acquires an infrared light image inside the bus, and the processing unit analyzes the infrared light image to acquire number-of-people information, body temperature information, or number-of-people information and body temperature information for being transmitted to the driving control center, based on which the control unit generates a control signal for being transmitted to the bus, so that the bus or equipment of the bus is operated according to the control signal.

* * * * *